United States Patent
Smeallie

[15] 3,651,484
[45] Mar. 21, 1972

[54] MULTIPLE PROCESS CONTROL SYSTEM
[72] Inventor: George R. Smeallie, Mentor, Ohio
[73] Assignee: Bailey Meter Company
[22] Filed: Aug. 12, 1969
[21] Appl. No.: 849,936

[52] U.S. Cl. ........................................................340/172.5
[51] Int. Cl. .....................G06f 3/05, G06f 9/00, G05b 15/00
[58] Field of Search................................................340/172.5

[56] References Cited

UNITED STATES PATENTS

| | | | |
|---|---|---|---|
| 3,281,793 | 10/1966 | Oeters et al. | 340/172.5 |
| 3,340,514 | 9/1967 | Swift | 340/172.5 |
| 3,400,374 | 9/1968 | Schumann | 340/172.5 |
| 3,509,539 | 4/1970 | Fichten et al. | 340/172.5 |
| 3,517,123 | 6/1970 | Harr et al. | 340/172.5 |

Primary Examiner—Paul J. Henon
Assistant Examiner—Harvey E. Springborn
Attorney—John F. Luhrs

[57] ABSTRACT

In a process control system employing a digital computer, an apparatus for and method of simultaneously controlling a plurality of processes. A parallel control input interface interrogates a set of output variables from each process and forms a plurality of data words which are addressed for display to the digital computer. The computer develops control words from the data words by the execution of a command program and addresses a parallel control output interface. The parallel control output interface accepts the control words from the digital computer and interprets the control words to simultaneously control the plurality of processes.

8 Claims, 1 Drawing Figure

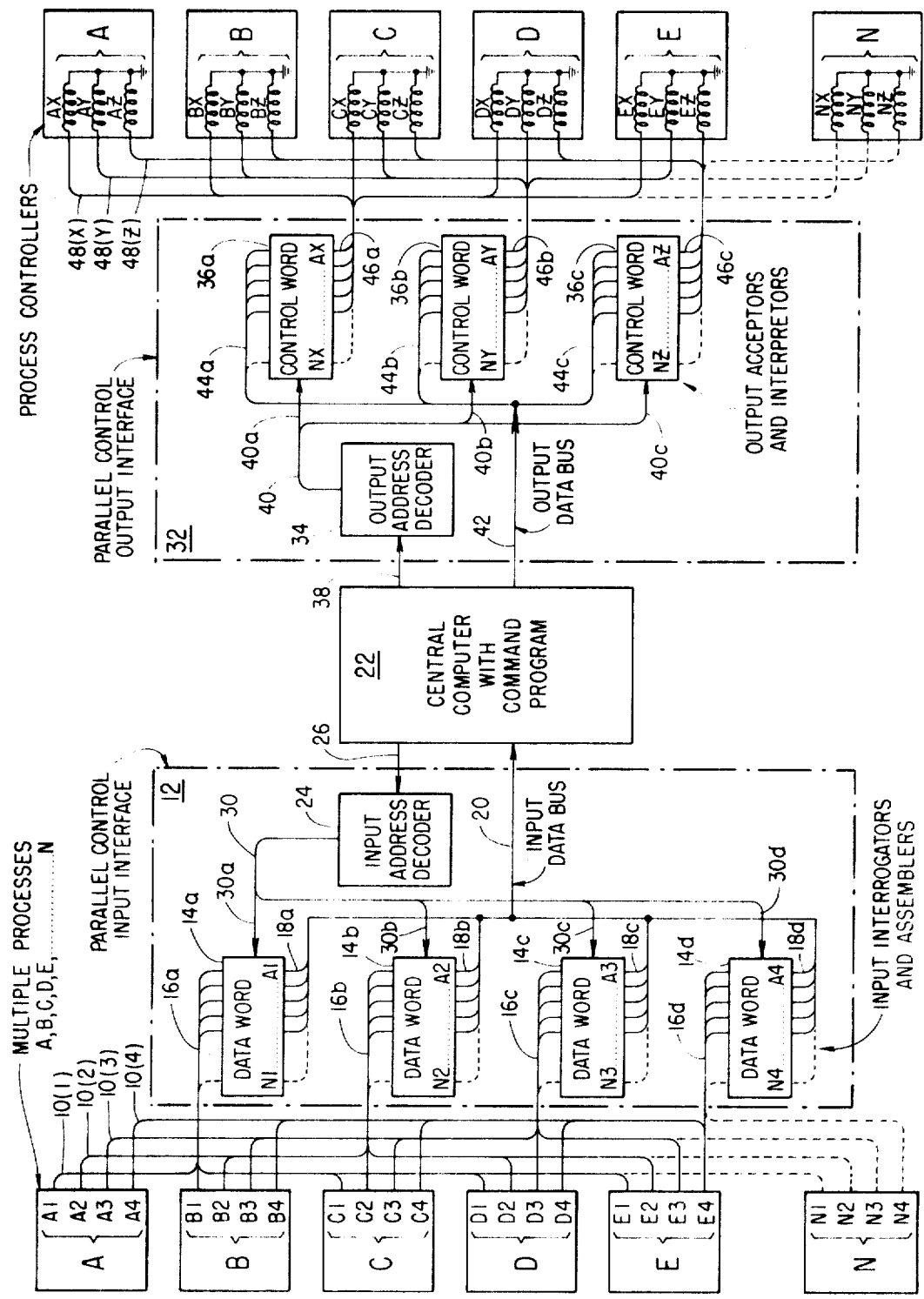

MULTIPLE PROCESS CONTROL SYSTEM

BACKGROUND OF THE INVENTION

1. Field of the Invention

The present invention relates generally to the art of process control systems and, more particularly, to process control systems employing a digital computer for controlling a plurality of processes.

The invention is particularly applicable to process control systems for controlling a plurality of similar processes simultaneously by a single execution of a command program and will be described with particular reference thereto although it will be appreciated that the invention has broader applications such as where a plurality of dissimilar processes is to be simultaneously controlled.

2. Description of the Prior Art

Multiple process control systems have heretofore comprised digital computer systems which perform a series of tests on the process output variables of each process. At least one execution of a command program is associated with the control of each process, and, hence, the processes are controlled sequentially. The series of tests performed on the output variables of each process is generally known as a test and branch program. If the multiple processes to be controlled are similar in nature, similar test and branch programs are used for the output variables associated with each process. An executive program is used to select the proper test and branch program for control of the respective process. The control of the several processes is thus effectuated in sequential fashion according to a predetermined priority schedule.

One of the principal problems of a multiple process control system of this type is that multiple executions of the test and branch programs are required in order to control the multiple processes. The frequency of control service to each of the processes is thus dependent upon several factors including the following: the number of processes to be controlled, the complexity of the control task for each process and the variability of the test and branch programs involved. Since there are finite limits on the speed at which the central processor can sequentially execute the test and branch programs for any given number of processes to be controlled, the frequency of control service to each of the processes is also limited.

Another problem with control systems of this type is that the memory requirements are inflated because of the need for memory locations for storing the data and programs required by this type of sequential data processing.

The present invention teaches a new and improved multiple process control system which overcomes all of the above-referred problems and others and provides a control interface which is compatible with many types of central processors.

SUMMARY OF THE INVENTION

In accordance with the present invention, there is provided in a process control system employing a central processor, an apparatus for and method of performing simultaneous control operations on a plurality of processes.

In accordance with an embodiment of this invention, a multiple process control system is provided including: input interface means for simultaneously interrogating a plurality of sets of process signal variables, the input interface means including means for assembling for use by a central processor a plurality of data words each having a pattern corresponding to the accumulation of outputs from the sets of process variables, the input interface means also including means for address decoding the assembled data words to transfer the data words to the central processor wherein a plurality of control words are developed from the data words by the execution of a command program; and, output interface means for address decoding the control words to transfer the control words from the central processor to the output interface means, the output interface means also including means for accepting the control words to simultaneously control the plurality of sets of process signal variables.

In accordance with a more limited aspect of the invention, the assembling means includes means for contiguously accumulating similar output variables from each of the sets of process variables in corresponding data words.

The principal object of the present invention is to provide an apparatus for and method of simultaneously controlling a plurality of processes.

Another object of the invention is to reduce the memory requirements of the central processor in a multiple process control system.

Another object of the invention, inherent in its operation, is the increased frequency of control service to each of the processes to be controlled; this benefit is realized in that either a given central processor can control a greater number of processes than heretofore achieved or a slower speed central processor can be utilized.

BRIEF DESCRIPTION OF THE DRAWING

The drawing is a block diagram of the invention as used in a multiple process control system.

DESCRIPTION OF THE PREFERRED EMBODIMENT

The drawing illustrates the invention as used in a multiple process control system wherein the multiple processes may take, for example, the form of a multiple burner furnace. This invention can also be used advantageously in an annunciator system and also for the control of several pumps or fans requiring startup and shutdown sequences. The application of this invention is easily expandable to the parallel control of any set of devices requiring similar command program sequences.

The multiple process control system is interposed between a plurality of processes A, B, C, D, E,...N and a like plurality of similarly designated process controllers. Process A has a set of output variables A1, A2, A3, and A4, and these output variables are connected through data lines 10(1), 10(2), 10(3), and 10(4), respectively, to a parallel control input interface 12. The parallel control input interface 12 includes a plurality of input interrogators and assemblers 14a, 14b, 14c, and 14d and an input address decoder 24.

A central computer 22 is provided with a command program and is connected to the input address decoder 24 over a signal line 26. The input address 24 outputs over a plurality of signal lines, generally designated 30, to the input interrogators and assemblers 14a, 14b, 14c, and 14d over the respective signal lines 30a, 30b, 30c, and 30d. The input interrogator and assembler 14a continuously accumulates the state of output variables A1, B1, C1, D1, E1,...and N1 over a plurality of parallel input data lines designated generally 16a. This information is represented as a DATA WORD within the input interrogator and assembler 14a. It should be understood that this DATA WORD is assembled in parallel. A like plurality of parallel output data lines 18a from the input interrogator and assembler 14a forms an input to the central computer 22 over an input data bus 20. A similar parallel arrangement of input data lines and output data lines, correspondingly numbered, facilitates the DATA WORD transfer from the remaining input interrogators and assemblers 14 b, 14c, and 14d. The parallel outputs from these interrogators and assemblers also form an input to the central computer 22 over the input data bus 20. The central computer 22 is adapted to operate on the DATA WORDS to form a plurality of CONTROL WORDS sequentially through the execution of a command program. The central computer 22 is a general purpose digital computer such as the following: a General Automation, Inc., SPC-12 Automation Computer; a Varian Data Machines, DATA 620/i Systems Computer; and, a Bailey Meter Company, BAILEY 855 Process Control Computer, all of which along with many other digital computers of which these are typical are programmable with command programs.

A parallel control output interface 32 includes an output address decoder 34 and a plurality of output acceptors and interpreters 36a, 36b, and 36c. A plurality of signal lines, designated generally 40, is connected from address decoder 34 to the respective output acceptors and interpreters 40a, 40b, and 40c. A CONTROL WORD for the plurality of processes is transferred in parallel to the output acceptor and interpreter 36a, and, similarly, CONTROL WORDS are transferred to the output acceptors and interpreters 36b and 36c. The central computer 22 is connected to the output address decoder 34 over signal line 38. An output control bus 42 connects the central computer 22 to the respective output acceptors and interpreters over parallel input control lines 44a, 44b, and 44c. The output acceptors and interpreters are connected over parallel output control lines 46a, 46b, and 46c and over output control lines 48(X), 48(Y), and 48(Z), to the process controllers for the plurality of processes. The process controller for the process designated A is shown to include a plurality of response devices, such as relay coils AX, AY, and AZ; each coil is connected to the similarly designated output control line at one of their respective terminals, and their remaining terminals are connected in common to ground. A similar arrangement is shown for each of the remaining process controllers, and, with this arrangement, each of the X relays are controlled simultaneously upon the output of the CONTROL WORD associated with output acceptor and interpreter 36a. Each of the relay coils designated Y are likewise controlled by the output of the CONTROL WORD for 36b, and the relay coils designated Z are similarly controlled by the output of the CONTROL WORD from 36c.

Operation

The system described above operates in the following fashion. The parallel control input interface 12 interrogates the state of each output variable of the plurality of processes and displays them to the central computer 22 as a plurality of data words.

The unit 14a simultaneously interrogates the state of each of the process output variables designated (1) and assembles them as a DATA WORD N1...A1. The units 14b, 14c and 14d likewise interrogate the states of the (2), (3) and (4) process output variables and assemble them as DATA WORDS N2...A2, N3...A3 and N4...A4, respectively. It should be understood that the length of each DATA WORD may be such that information from each process, a ONE or a ZERO, when contiguously packed into the DATA WORD, fills it.

The method of assembling each of the (1), (2), (3) or (4) process variables into a single DATA WORD is particularly useful for logical operations. Logical operations include loading of registers, storing of data, complimenting the contents of a register, AND and OR operations between DATA WORDS, shifting the contents of registers and testing of external contacts or logic units. This method of assembling DATA WORDS can also be extended to mathematical operations which include addition, subtraction, multiplication, division, square rooting, analog to digital conversion, digital to analog conversion and logical operations associated with register overflow. One technique for representing multi-valued mathematical variables by the presence of ONE OR ZEROS is known as Stochastic data conversion. See Electronics magazine July 10, 1967, "Stochastic Computer Thrives on Noise" by Brain R. Gaines. Using Stochastic data conversion, the A1 position in the first DATA WORD would represent that variable in process A. The B1 position in the first DATA WORD would represent that variable in process B and so on for each process. Each DATA WORD would represent the same variable in all processes in the same way that DATA WORDS represent data for logical operations.

Another technique for representing multi-valued mathematical variables is known as multiple-precision data handling. With this technique, a DATA WORD is assembled in groups of notations, each group representing a process variable from one of the processes. For example, if the A1 process variable requires eight notations and the B1 process variable, along with the (1) process variables remaining, each require eight notations, then N/three DATA WORDS would be required if each DATA WORD contained 24 notations. The data is contiguously packed until a DATA WORD is full, and a second DATA WORD is packed full, etc., until all of the multiple process output variables have been assembled. The number of DATA WORDS representing the output variables from the multiple processes depends on the number of processes and process variables from each process, the length of a DATA WORD and the desired accuracy of the data.

In any event, for logical operations, the central computer 22 addresses the input address decoder 24 according to the execution of a command program within the central computer 22. The output of decoder 24 is over the signal lines 30 to one of the units 14a, 14b, 14c or 14d which is its address. The central computer reads in the DATA WORD over the input data bus 20, and then addresses the next DATA WORD, etc., according to the sequential execution of the command program. After a single execution of the command program, the central computer 22 has developed a plurality of CONTROL WORDS by logical operations which it outputs to the respective units 36a, 36b and 36c.

The central computer 22 addresses the output address decoder 34 for the plurality of process control devices to be controlled, X, Y or Z, in each of the processes. The decoder 40 outputs over signal lines 40 to the particular unit, 36a, 36b or 36c, which is its address. The parallel control output interface accepts a CONTROL WORD NX...AX into unit 36a. The CONTROL WORDS NY...AY and NZ...AZ are similarly accepted into units 36b and 36c, respectively. The unit addressed interprets the CONTROL WORD and applies control to the X, Y or Z process control devices. With the X CONTROL WORD, all of the X process control devices in the N processes are controlled simultaneously in parallel. The Y and Z CONTROL WORDS are interpreted by the units 36b and 36c, the former controlling the Y process control devices simultaneously and the latter controlling the Z process control devices simultaneously.

In this one execution of the command program within the central computer, data has been taken from all N processes, each of which may be in a different state, the required logical manipulations have been performed on the data and the process controllers have been supplied with control information to control each process independently according to its own input data.

While one illustrative embodiment of apparatus for and method of controlling multiple processes has been described, it should be understood that the concepts thereof may be applied to other embodiments without departing from the spirit and scope of this invention. For example, this invention can be used for direct digital control in a control system including a central computer capable of performing mathematical operations on Stochastic data or multiple precision data.

I claim:

1. A process control system employing a central processor, a control interface for performing parallel control operations, comprising:

input interface means for simultaneously interrogating a plurality of sets of process signal variables, each said set having a plurality of outputs, said input interface means including means for assembling for use by said central processor a plurality of data words, each said data word having a pattern corresponding to the accumulation of said outputs from said sets, said input interface means also including means for address decoding said assembled data words to transfer said data words to said central processor, said central processor having means for developing a plurality of control words from said data words; and output interface means including means for address decoding said control words to transfer said control words from said central processor to said output interface means, said output interface means including means for accepting said control words to simultaneously control said plurality of sets of process signal variables.

2. The control interface of claim 1, wherein said assembling means includes means for contiguously accumulating similar output variables from each of said sets of process variables in corresponding data words.

3. The control interface of claim 2, wherein said computer control word developing means includes means for performing logical operations on said data words.

4. The control interface of claim 3, wherein said computer control word developing means includes means for performing mathematical operations on said data words.

5. The method of simultaneously controlling a plurality of processes, each process having a set of output signal variables, which comprises the steps of:
 a. interrogating and assembling the output variables of the processes as a plurality of data words for display to a central processor,
 b. address decoding the assembled data words for input to said central processor,
 c. processing the data words within said central processor to develop a plurality of control words,
 d. address decoding the control words for output, and
 e. accepting and interpreting each control word to simultaneously control the plurality of process variables.

6. The method of claim 5, wherein said step of assembling includes contiguously accumulating similar output variables from said sets in corresponding data words.

7. The method of claim 6, wherein said step of processing includes performing logical operations on the data words.

8. The method of claim 7, wherein said step of processing also includes performing mathematical operations on the data words.

* * * * *